United States Patent [19]

Kittag

[11] 4,054,920
[45] Oct. 18, 1977

[54] DEVICE FOR STORING ELECTROMAGNETIC CONTROL SIGNALS ON MAGNETIC STRIP MATERIAL AND A SOUND FILM PROJECTOR EQUIPPED THEREWITH

[75] Inventor: Gerd Kittag, Vienna, Austria

[73] Assignees: Karl Vockenhuber; Raimund Hauser, both of Vienna, Austria

[21] Appl. No.: 654,922

[22] Filed: Feb. 3, 1976

[30] Foreign Application Priority Data

Feb. 6, 1975  Austria .................................. 894/75

[51] Int. Cl.² ...................... G11B 13/04; G11B 15/06
[52] U.S. Cl. .......................................... 360/3; 352/19; 360/13; 360/80
[58] Field of Search .......................... 360/3, 80, 72, 13; 352/19, 20, 92, 5, 12, 133

[56] References Cited

U.S. PATENT DOCUMENTS

| | | | |
|---|---|---|---|
| 2,843,446 | 7/1958 | Pettus | 360/80 |
| 3,409,744 | 11/1968 | Liberman | 360/13 |
| 3,440,362 | 4/1969 | Leman | 360/13 |
| 3,527,529 | 9/1970 | Taesler | 352/19 |
| 3,578,852 | 5/1971 | Aldridge | 352/20 |
| 3,622,229 | 11/1971 | John, Jr. | 360/80 |
| 3,644,683 | 2/1972 | Braun | 360/13 |
| 3,820,881 | 6/1974 | Friesen | 352/5 |
| 3,916,121 | 10/1975 | Stuzzi | 360/13 |

FOREIGN PATENT DOCUMENTS

| | | | |
|---|---|---|---|
| 2,147,779 | 3/1973 | Germany | 360/80 |
| 2,355,123 | 5/1974 | Germany | 360/72 |

Primary Examiner—Jay P. Lucas
Attorney, Agent, or Firm—Fleit & Jacobson

[57] ABSTRACT

A circuit for storing a control signal on a selected length of strip material such as a magnetic tape having a tape head associated therewith and provided with longitudinally spaced marking signals. The circuit includes a control signal generator arranged to be switched on by a control unit to produce a control signal which is applied to the selected length of strip material, and a first detector responsive to the marking signals for switching off the control signal generator when a marking signal is sensed in one direction of movement of the tape material together with a second detection responsive to the stored control signal for switching on the control signal generator during the movement of the tape in the other direction to store the control signal throughout the selected length of strip material, the first detector switching off the control signal generator when the other marking signal is sensed by the first detector.

11 Claims, 4 Drawing Figures

4,054,920

DEVICE FOR STORING ELECTROMAGNETIC CONTROL SIGNALS ON MAGNETIC STRIP MATERIAL AND A SOUND FILM PROJECTOR EQUIPPED THEREWITH

BACKGROUND OF THE INVENTION

The invention relates to a device for the storage of electromagnetic control signals on at least one selected longitudinal section of magnetic strip material such as a magnetic tape, a motion picture film equipped with magnetic sound tracks, and the like, the beginning and/or the end of each longitudinal section being defined by a mark and a magnetic head operatively associated with the magnetic strip material and connected to means for the amplification of recording and reproduction.

In addition, the invention also relates to a sound film projector having a device as described above, for the production of motion picture films, preferably narrow films, provided with at least two magnetic sound tracks, at least one sound track being associated with a magnetic head connected with means for the amplification of recording and reproduction, and arranged for the storage of acoustic signals such as commentary, accompanying music, etc., while the other magnetic sound track of the motion picture film is arranged for the storage of the control signals.

A sound film projector for narrow film is well known and has, besides the customary recording key, an erasing key through the actuation of which information already stored on the magnetic tape track of the film may be erased and new information may be stored. By means of this erasing key, it is possible to erase passages of any desired length. The provision of such a device on a sound projector brings about a simplification of operation when compared to the switches previously used. However, when it is desired to erase a sequence completely and apply new commentary or new accompanying music and/or sounds to that sequence of pictures, it would be necessary to identify the beginning of the sequence with precision, and to immediately actuate the erasing key. Similarly, the erasing key would have to be released exactly at the end of the sequence. But, in practice, this can hardly be achieved and/or may not be expected from the operator. Particularly, in the case of "life-sound" recordings, imperfect sound recordings frequently occur and must be replaced later by recordings of better quality. In most cases, a complete sequence is of inferior quality so that the amateur is compelled to erase the acoustic information stored at the time of the recording from the beginning of the sequence to its end.

SUMMARY OF THE INVENTION

The present invention is directed to the challenge of creating a device and/or film projector that makes it possible to precisely erase and/or to produce information stored on magnetic tape over a predetermined section of the tape. The magnetic tape may be of the type utilized as sound track on a motion picture film. Consequently, in accordance with the invention, in the case of a device of the type referred to above, there is provided a driving unit which moves the magnetic tape or the like alternatively forward and backward, a control signal generator for producing a control signal and a first detector responsive to the markings on the tape. A control signal, in the forward direction of the tape, may be switched on at least by means of a manually operated switch, and may be switched off by the output signal of the first detector actuating the control generator. Also provided in a second detector which picks up the control signal stored during forward direction movement of the tape, and the output signal of which is transmitted to a control unit associated with the control signal generator for its actuation at least during the movement of the tape in the opposite direction. For the application of the markings to a motion picture film, a light source may be mounted in the film camera and directed onto the photo sensitive layer on the film, the light source may be switched on momentarily when the release of the film camera is actuated so that optical markings will appear on the film after the film has been developed.

It is possible, moreover, to use any type of signal generator for the application of the markings, but the frequency of the signal generator must be chosen so as to be different from that of the control signal.

With the aid of the device in accordance with the invention, it is possible to obtain advantageously, by a brief actuation of the manually operated switch at any given point in time, the storage of a control signal over the entire longitudinal section of the tape which is run past the magnetic head during the actuation of the switch. The device, constructed in accordance with the invention, can be used to particular advantage, for the control of a sound film projector that is intended to offer the possibility of performing precision erasure by sequences of the acoustical signals. When a motion picture film is used that has, besides the customary sound track, a compensating track that has an essentially equivalent structure, it is possible as early as during the take in a "Lifeton" (life-sound) camera, to apply a brief electromagnetic marking signal at the beginning of each sequence. In accordance with the invention, it is suggested that a sound film projector of the type referred to above be provided with a detector connected with the output of the magnetic head for picking up the control signals, the magnetic head being operatively associated with the sound track on which the control signals are stored by way of a switch that is preferably operated manually, the switch selectively connecting the output of the recording amplifier with the magnetic head or the input of the reproduction amplifier with the magnetic head.

Thus, the control signal applied to the compensating track with the aid of the device constructed in accordance with the invention switches on the recording amplifier for the storage of information exactly at the beginning of a certain sequence, and switches it off exactly at the end of the sequence, while the recording amplifier is switched on again at once at the beginning of the next sequence. The operator will, therefore, be able to concentrate to advantage on the production of the information to be stored, and he will not be distracted by the necessity to manipulate the device.

BRIEF DESCRIPTION OF THE DRAWINGS

Several embodiments of the invention have been shown in the drawings, by way of examples.

DETAILED DESCRIPTION OF THE PREFERRED EMBODIMENT

Figure 1:
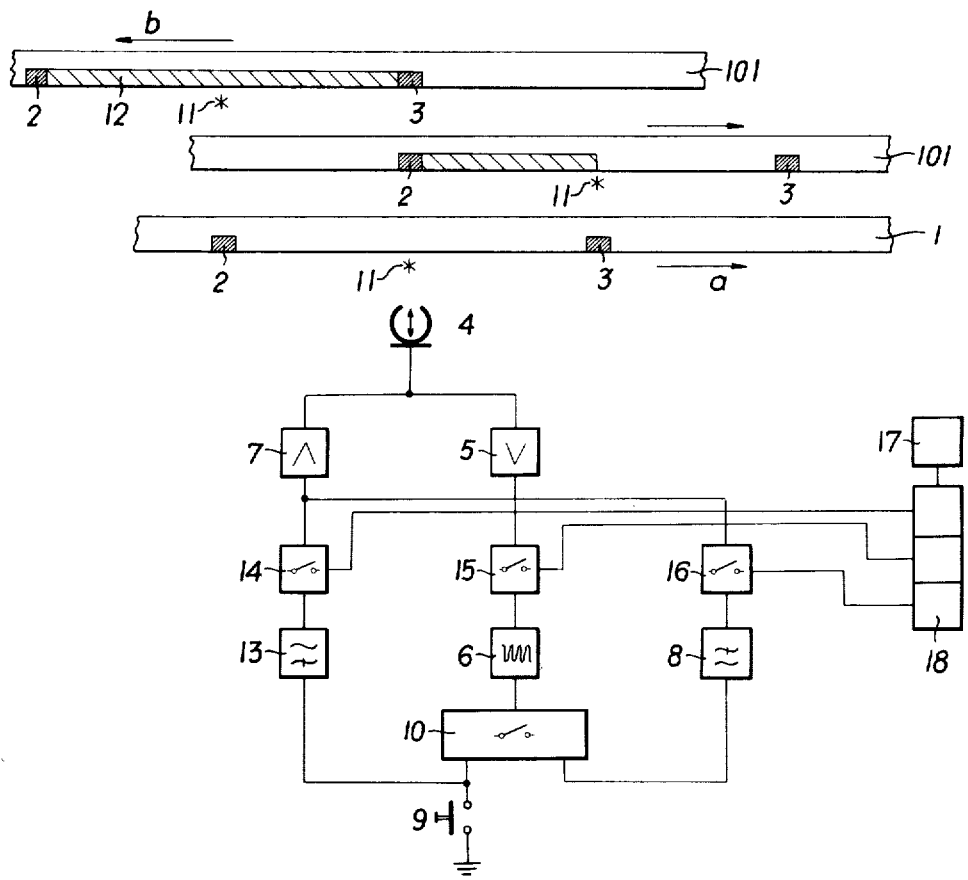
FIG. 1 is a schematic illustration of a block wiring diagram of the device constructed in accordance with the invention.

Referring now to FIG. 1, there is shown a magnetic tape 1 on which an electromagnetic marking signal 2 and an electromagnetic marking signal 3 have been stored. Marking signal 2 marks the beginning of a prescribed longitudinally extending section on the tape, and marking signal 3 marks its end. The magnetic tape 1 is advanced by means of a driving unit (not shown) past a magnetic head 4, in the direction of arrow "a". A control signal generator 6 is connected with the magnetic head 4 through a recording amplifier 5. In addition, the magnetic head 4 is connected with a first detector 8 by way of a reproduction amplifier 7. The detector 8 consists of a frequency-selective input stage and a subsequent second detector. The marking signals are stored at an audio frequency of one key on the magnetic tape 1 and the selective input stage of detector 8 is tuned to that frequency.

When the longitudinal section on the magnetic tape 1, as defined by the marking signals 2 and 3, is to be provided with a control signal by the control signal generator 6, a control unit 10 is actuated by means of a key 9, and the longitudinal section of the tape is advanced past the magnetic head 4. Then, the control unit 10 sends the operating voltage to the control signal generator 6. The control signal generator 6 also generates an audio frequency signal, having a frequency of 5 kHz. A multivibrator, a blocking oscillator, a phase-shifting oscillator may be used as the control signal generator 6.

The location on the magnetic tape 1 between the marker signals 2 and 3, where the control signal generator was actuated by means of the key 9, has been indicated by the asterisk 11. Inasmuch as the magnetic tape 1 is advanced past the magnetic head in the direction of the arrow "a", the storage of the control signal will take place from the position where the control signal generator 6 is cut in (asterisk 11), and the storage of the control signal will then continue until the marker signal 2 reaches the magnetic head 4 and is picked up by the detector 8, as is shown on the magnetic tape 101 (tape 1). The control signal to which the reference numeral 12 has been assigned will then have been stored within a range extending from the asterisk 11 to the marker signal 2 on the magnetic tape 101 (or tape 1). The control signal generator 6 is deactuated by the outset signal of detector 8 which cuts off the control unit 10.

In order to also store the control signal 12 between the location of asterisk 11 and the electromagnetic marker signal 3 on the magnetic tape 101 (or tape 1), the magnetic tape is advanced past the magnetic head 4 in the opposite direction as shown by arrow "b". A detector 13 is connected to the reproduction amplifier 7 for the automatic switching-on of the control signal generator 6. The detector is provided with a selective input stage and a subsequent second detector, and provides an output signal which is conducted to the control unit 10 so as to switch the control unit 10 on.

Consequently, when the detector 13 picks up the control signal 12, while the magnetic tape is advanced in the direction of arrow "b," the control signal generator 6 will be switched on by means of the control unit 10, until the marker signal 3 is picked up by the detector 8, the output signal of which again deactuates the control signal generator 6 through the control unit 10. The control signal 12 was stored over the longitudinal sector, as defined by the marker signals 2 and 3 of the magnetic tape 101 (or tape 1). When a frequency of approximately 1 kHz is provided for the marker signals 2 and 3 and a frequency of some 5 kHz is assigned to the control signal 12, the selective input stages of detectors 8 and 13 are preferably in the form of low pass and high pass filters, respectively. The control unit 10, which actuates the control signal generator 6, may consist of a holding circuit, a bistable sweep stage (flip-flop) having a "setting-input" to which the output of the detector 13 and the key 9 are connected, while the output of the detector 8 is connected to the "back-setting-input." The output signal of the control unit 10 is conducted to the control signal generator 6.

The magnetic head 4 is preferably a combination head for both recording and reproduction. To prevent a mutual interference of the currents that flow through the magnetic head 4 during the recording and reproduction of the control signals and/or marking signals, it has been arranged for the currents of the switching network of the detector 8, the control signal generator 6 and the detector 13 to be conducted to the various electronic components in a timed sequence. To that end, electronic switches 14, 15 and 16 have preferably been provided in the circuits of the detectors 8 and 13 and of the control signal generator 6 which are controlled by a shift register 18 controlled by an impulse generator 17. The impulse frequency of the impulse generator 17 is selected in such a way that it will be considerably higher than the signal frequency of the control signal 12 and of the marker signals 2 and 3.

A control signal that has been stored in the device, constructed in accordance with FIG. 1, may be used for the control of recording amplifiers and reproduction amplifiers of a magnetic tape device that is in the form of a multiple-track instrument. With such a tape, pieces of music have been recorded on one of the tracks, and the beginning of each piece of music has been identified by marker signals 2 and 3 on an additional track. When it is desired to precisely erase a certain piece of music from beginning to end and to replace it by a new one, the only requirement is that, during the play-back of that particular piece of music, the key 9 be actuated in order to start the process of erasure. Then, after the return travel of the magnetic tape, a control signal has been recorded on the tape corresponding exactly to the length of such piece of music and the control signal will be used for the control of the recording amplifier when a new piece of music is recorded.

The setting to music of a motion picture film can be achieved particularly advantageously and simply with the aid of a film projector that is equipped with a device constructed in accordance with FIG. 1.

Figure 2:
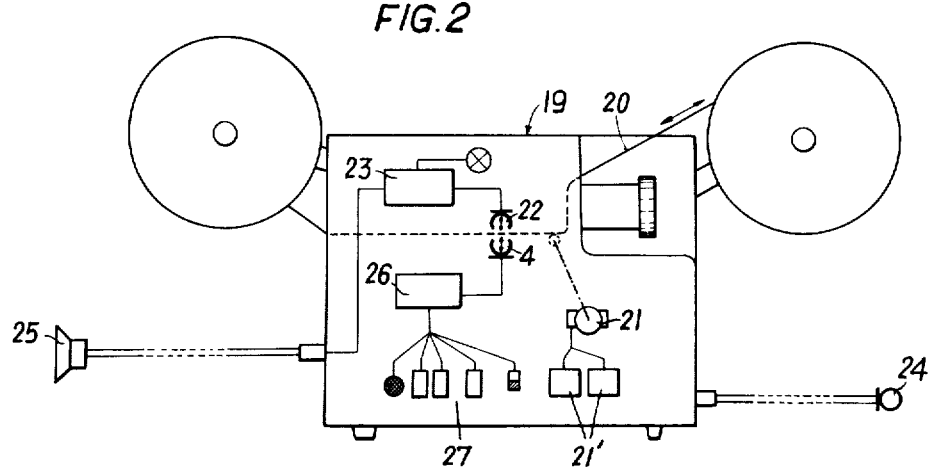
FIG. 2 is a schematic illustration of a motion picture projector incorporating the device of the invention.

FIG. 2 shows a film projector 19 for the projection of a motion picture film 20 which is provided with two sound tracks. The movement of the motion picture film is accomplished by means of an electric motor 21 having a shaft, the driven end of which may be operated for clockwise and counter-clockwise movement by actuation of keys 21'. The magnetic head 22, which is connected to an amplifier 23 for recording and play-back of the accompanying text and/or the musical background of the various sequences of the film, is associated with one sound track of the motion picture film 20. A microphone 24 on the one hand, and a loud-speaker 25 on the other hand, are connected to the recording and reproduction amplifier 23. The magnetic head 4, with which the device constructed in accordance with FIG. 1 is connected, is associated with the other sound track of the motion picture film 20. The device in accordance with FIG. 1 has been designated by 26 in FIG. 2 and keys 27 have been provided for the operation of the device 26.

Figure 4:
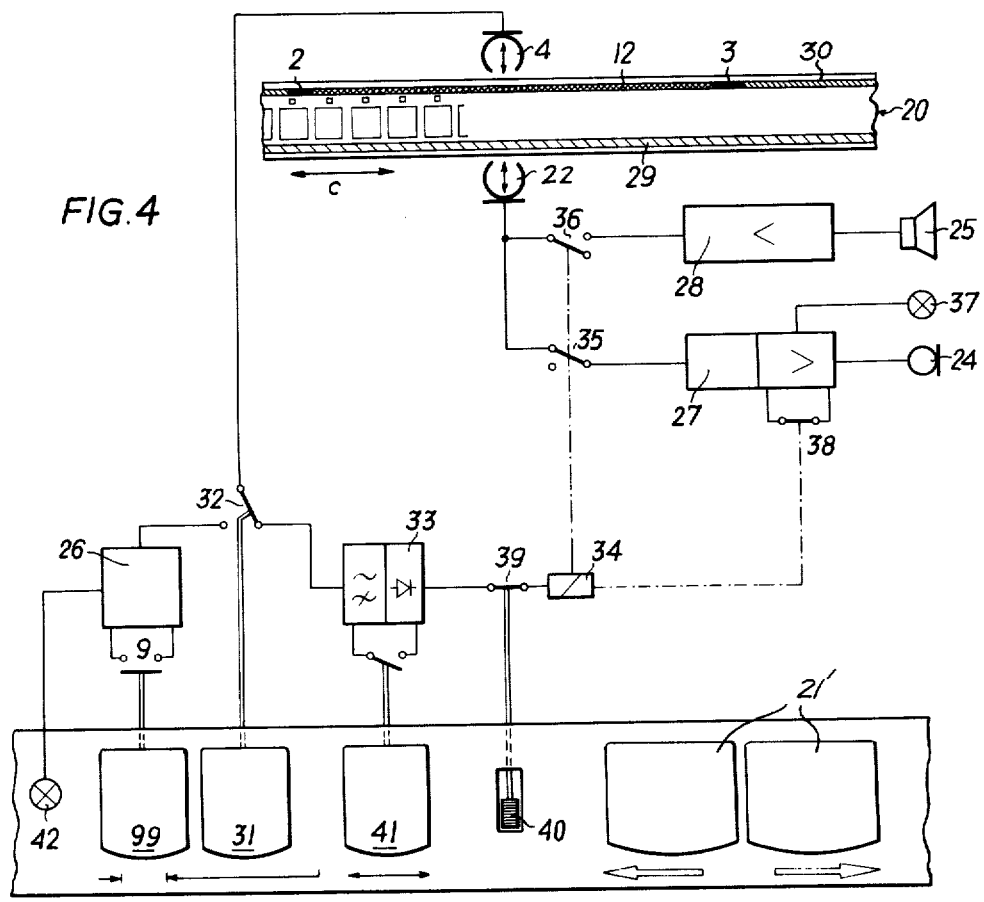
FIG. 4 is a diagrammatic illustration of the device of the invention in association with a sound film projector.

In FIG. 4, there is shown the electrical interconnection of the device 26 with a recording amplifier 27 and a playback amplifier 28 for the sound film projector shown in FIG. 2. The motion picture film 20 carries a further sound track 29 on which background music, commentary, and the like have been stored. In addition, the motion picture film 20 carries a further sound track 30 on which the marker signals 2 and 3, that identify the beginning of each sequence have been stored. The magnetic head 4 is associated with the sound track 30. The reproduction amplifier 28 or the recording amplifier 27 may be connected alternatively with the magnetic head 22. The motion picture film 20 may be driven, in accordance with the double arror "c", by a driving unit (not shown) for both forward or reverse movement.

When the operator has found that one or the other sequence presents unsatisfactory sound qualities or an incorrect commentary, and wants to re-record certain sequences, key 31 on the projector may be actuated whereby the magnetic head 4 is connected with the device 26 by way of the change-over switch 32. In this way, it is possible to set up a program by which information that appears in certain sequences will be erased. By actuation of the pertinent key 21, the film 20 is advanced in the reproducing direction. When the operator is of the opinion that the sequence reproduced at any point in time does not meet the desired requirements, key contact 9 of the device 26 is actuated by means of key 99. As previously described with reference to FIG. 1, a control signal on the sound track 30 is stored from the moment of the actuation of key 99 up to the end of the sequence in question. Whenever the operator wants to re-record the sound of an entire sequence, he need only actuate key 99 briefly during the play-back of the motion picture film 20 within the sequence in question. When all sequences found unsatisfactory have been moved past the magnetic head 4, the key 21' for reverse motion, will have to be actuated whereby the film 20 is driven in the opposite direction. The supplementation of the control signals on the sound track 30 takes place by means of the device 26. As previously described with reference to FIG. 1, the control signals are used to control the recording amplifier 27 and the reproduction amplifier 28. For that purpose, the change-over switch 32 must be actuated by means of key 31, whereby the magnetic head 4 is connected with a detector 33. The detector 33 has a selective input stage that is tuned to the frequency of the control signals of the sound track 30. An intensifier stage and/or second detector is connected with the input stage of the detector 33 for control of a relay 34. The relay 34 is used for the actuation of the switching contacts 35 and 36. When the relay 34 is de-energized, the switching contact 36 connects reproduction amplifier 28 with the magnetic head 22. When the relay 34 is energized, the switching contact 35 connects the output of the recording amplifier with the magnetic head 22. Consequently, the changeover from reproduction to recording or from recording to reproduction easily takes place, completely and automatically, by means of the equipment of the projector. In this way, the operator is able to attend to the speaking and inputting of commentary, etc., without being distracted by any manipulation of the equipment. The sound that accompanies a sequence which was not programmed for recording, will be reproduced over the loud speaker 25.

When, at the beginning of a sequence, a control signal is picked up by the detector 33, the switch-over to recording takes place without delay. Preferably optical indication of recording is provided by means of signal light 37. When the sequence to be recorded has been recorded completely, the signal light 37 will go out, and the acoustic information that has been stored on the film earlier will be heard over the loud speaker 25. In addition, it is possible to actuate a fading-in device of the recording amplifier 27 by means of the relay 34, by way of the switching contact 38. In the pilot wire of the relay 34, a circuit breaker 39 has been provided which may be actuated by means of the handle 40. The circuit breaker 40 has been provided in order to prevent any actuation of the recording amplifier 27 after the completion of the acoustical setting, and thereby to forestall any erasure of background music or similar accompaniment that might have been caused by an incorrect operation of the film projector.

It should be pointed out that the relay can be energized continuously by actuation of the keys 41 and in that way, a complete erasure and/or new recording of the accompanying sound on the motion picture film may be achieved. A signal light 42 is provided in the device 26 in order to monitor the operating sequence of the device 26. In addition, a circuit breaker may be provided between the output of the recording amplifier 27 and the switching contact 35 so that when the circuit is actuated, it will be possible to regulate the stored control program while any erasure or new recording of background music or similar accompaniment is prevented. Background music fed to the recording amplifier could in this case be reproduced over the reproducing amplifier 28 so as to test passages occurring during transitions from one sequence to another.

Figure 3:
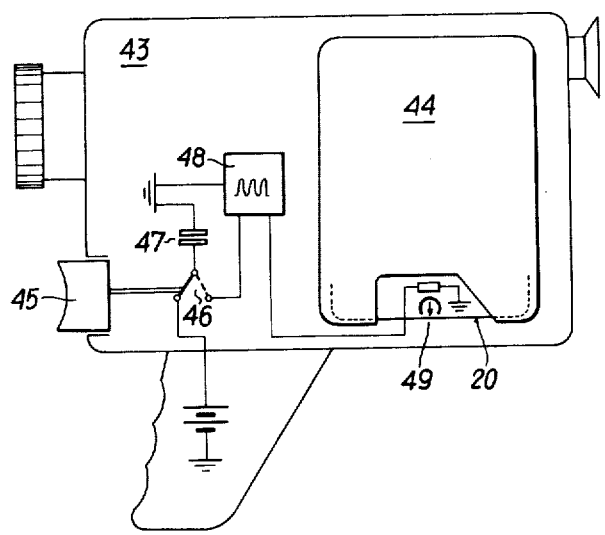
FIG. 3 is a schematic illustration of a motion picture camera incorporating the device of the invention.

In FIG. 3, a motion picture camera 43 for "life-sound" (Lifeton) recordings is shown. The motion picture film is stored in a cassette 44. The diaphragm, shutter and film movement mechanism may be switched on by means of the release knob 45. In addition, it is possible by means of the release knob 45 to actuate a switching contact 46 through which the charge potential of a condenser 47 may be conducted into the control input of a sound generator 48. The alternating-current voltage of the audio frequency is conducted, after appropriate processing is necessary, onto a magnetic head 49 which is associated with the particular sound track of the motion picture film 20 that has been provided for the storage of the control signals. Whenever the release mechanism 45 is actuated by the operator, that is, whenever a new sequence is initiated, the sound generator 48 will be triggered by the charge on the condenser 47, and a marker signal will be put on the sound track of the motion picture film 20 by way of the magnetic head 49. The motion picture films 20 that are stored in cassette 44 and which are provided with two sound tracks as shown in FIG. 3, are available commercially.

Likewise, it is possible to provide motion picture films with sound tracks which have already been exposed and developed. In order also to apply to these motion picture films, marker signals that identify the beginning or end of a sequence, it is possible to mount a sound generator in a film projector which generates a marker signal when a sequence begins, and which directs it onto the magnetic head 4. But, in order to determine the precise beginning of the sequence, it is necessary, in this case, to manually bring the film into the correct position; and this is feasible in most projectors. The sound generator may be actuated briefly and simultaneously with the subsequent switching-on of the film movement mechanism. Even though this type of application of the marker signals requires a certain amount of time, it nevertheless offers the advantage that afterwards, one is able continuously to apply the sound to the film without being distracted by any manipulations of the projector. Generally speaking, "life-sound" (Lifeton) films, as well as films to which sound has been added later, can be redone with the aid of the device constructed in accordance with the invention or with the aid of the sound film projector constructed in accordance with the invention.

Above, a specific embodiment of the present invention has been described. It should be appreciated, however, that this embodiment was described for purposes of illustration only, without any intention of limiting the scope of the present invention. Rather, it is the intention that the present invention be limited not by the above but only as is defined in the appended claims.

What is claimed is:

1. A device for the storage of electromagnetic control signals on at least one longitudinally extending section of magnetic strip material such as magnetic tape, motion picture film, and the like, the opposite ends of each section being defined by marker signals and arranged to be operatively associated with a magnetic head connected to recording and reproduction amplifying means comprising, in combination, means for advancing said strip materials selectively either in a forwards or backwards directions a control signal generator; a control unit connected to said control signal generator for activating said control signal generator; first switch means connected to said means for advancing to select said forward direction and connected to said control unit to activate said signal generator during the advance of the strip material in said forwards direction to store a control signal on the strip material; a first detector responsive to the marker signals on the strip material for deactuating said control unit and said signal generator when one of said marker signals is detected by said first detector through the magnetic head; second switch means connected to said means for advancing to select said backwards direction; and a second detector connected to said control unit and responsive to said control signal at least during the advance of the strip material in said backwards direction for causing said control unit upon detecting said control signal to activate said control signal generator to store said control signal on said section of the strip material whereby when said first detector detects a marker signal said control unit is deactuated and the entire section of strip material then contains said control signal.

2. A device in accordance with claim 1, wherein the marker signals on the opposite ends of the strip material are in the form of optical devices and including a light barrier responsive to said optical devices.

3. A device in accordance with claim 1, wherein the marker signals on the opposite ends of the strip material are in the form of electromagnetic signals stored thereon, and including a magnetic head operatively associated with the strip material for sensing said electromagnetic signals and said control signal, a recording amplifier and a reproduction amplifier connected to said magnetic head.

4. A device in accordance with claim 3, wherein said marker signals comprise an audio frequency alternating current voltage, and wherein the control signal produced by said control generator comprises an audio frequency alternating current voltage having a frequency different from the voltage of said marker signals.

5. A device in accordance with claim 4, wherein each of said first and second detectors include an input stage, said input stages comprising frequency-selective filter means.

6. A device in accordance with claim 5, including a plurality of switches each connected to a respective one of the input stages of said first and second detectors and the ouput of said control signal generator, and including a synchronizing generator for selectively actuating said plurality of switches.

7. A device in accordance with claim 1, wherein said control unit comprises a bistable circuit breaker.

8. A device in accordance with claim 7, wherein said bistable circuit breaker comprises a flip-flop sweep stage having first and second inputs and an output and wherein said switch means comprises a sender-key contact and including means for connecting the output of said second detector to said sweep stage first input, means for supplying a bias-reducing potential through said sender-key contact to said sweep stage first input, means for connecting the output of said first detector to said sweep stage second input, and means for connecting the output of said sweep stage to the control input of said control signals generator.

9. A device in accordance with claim 1, in combination with a sound film projector advancing motion picture film having a pair of magnetic sound tracks, a magnetic head operatively associated with each of said sound tracks, one of said sound tracks being arranged to store said control signals and the other of said sound tracks being arranged to store oral commentary, background music and the like, a recording amplifier and a reproducing amplifier operatively associated with at least one of said sound tracks, means including a manually operated switch and a selector switch connected to the output of said second detector, said selector switch being arranged to selectively connect the output of said recording amplifier with the other said magnetic head or the input of the reproduction amplifier with said other magnetic head.

10. A device in accordance with claim 9, wherein said selector switch comprises a relay having a pair of contacts.

11. A device in accordance with claim 9, including means comprising a circuit breaker for connecting said second detector to said selector switch, and wherein the film projector includes a function selector switch for actuating said circuit breaker.

* * * * *